Inventors:
Karl Spohn
Gerhard Föll
By Nolte & Nolte
Attorneys

United States Patent Office 3,170,219
Patented Feb. 23, 1965

3,170,219
TOOL CARRIAGE
Karl Spohn, Oberesslingen (Neckar), and Gerhard Föll, Goppingen, Germany, assignors to Index-Werke KG, Hahn & Tessky, Esslingen (Neckar), Germany
Filed Mar. 9, 1962, Ser. No. 178,760
Claims priority, application Germany, Mar. 16, 1961, J 19,608
4 Claims. (Cl. 29—35.5)

This invention relates to a tool carriage, and in particular to a tool carriage adapted for rapid movement in automatic machines.

The use of rapidly moving tool carriages in automatic turning machines is well known in the art. The carriages reciprocate along a path, back and forth, to and from the workpieces which are machined one after the other in series production.

Such tool carriages, which for the sake of simplicity are to be further described herein in the embodiment of a turret tailstock of a lathe, are controlled and driven by a great variety of controlling elements.

A turret tailstock is generally adapted to proceed reciprocatingly along its path, by gliding on a sliding surface, which generally forms part of, or is attached to the tailstock housing. Such a tailstock may contain a turret head having a great variety of machining tools fastened therein, adapted to be brought into engagement with the workpiece by means of rotating the turret head. The movement of the tailstock can be controlled by means of, e.g., a programming cam, a lever, etc., from a principal drive provided in the machine.

The reciprocating movement of the tailstock depends on the rate of change of each individual workpiece and occurs, in automatic machinery, generally within fractions of a second. If a turret tailstock is used, the turret can be rotated within this short period while the tailstock describes the above mentioned reciprocating movement. The various tools contained in the turret are generally of considerable weight, consequently the entire tailstock has a large mass requiring considerable driving force from the actuating mechanism. Furthermore, generally a considerable feed pressure must be accepted by the tailstock, which adds to the power requirements of the actuating mechanism.

For the above outlined reasons, the tailstock has to be of sturdy construction. This was heretofore accomplished by constructing the entire housing with a single gray iron casting. As a result thereof, the construction was bulky and heavy, increasing the performance requirements of the actuating mechanism, resulting also in a loss of synchronization of movement, and a rapid wear on the frictional surfaces with attendant maintenance requirements and considerable downtime.

It is an object of the invention to provide a lightweight, sturdy tool carriage, such as a tailstock housing, overcoming the drawbacks of known carriages.

It is another object of the invention, to provide a tailstock housing wherein the entire operation can be accomplished in ¼ of a second, and the reciprocating movement can be accomplished in 1/12 of a second.

It is yet another object of the invention to provide a tailstock housing construction resulting in increased machine life, reduction of maintenance and downtime, and a simplified machine structure.

According to the invention, the housing of the tailstock is made of a light metal, whereby a considerable reduction of the weight of the tailstock can be accomplished. This will also result in considerable saving in the manufacturing costs of the machinery. The tool carriage, according to the invention, discussed in the embodiment of a tailstock, can be used in both hand operated as well as automatically guided feed machines. By reducing the weight of the carriage, the power requirements of the actuating mechanism are correspondingly reduced; consequently, a smoother and more stable gliding movement can be accomplished. In order to prevent a rapid wear of the frictionally engaged surfaces, in the preferred embodiment a hard metal gliding surface coating is applied to the gliding surface of the light metal tailstock housing. This hard metal surface can be of, e.g., molybdenum which can be sprayed on the surface, and subsequently ground smooth.

As a further feature of the invention, in order to constantly maintain the tools in the turret head in alignment with the workpiece, the turret can be located in the housing, thus no backlash will occur. The turret head could be journaled into the tailstock housing by employing two ball bearings, but in the preferred embodiment, the turret head is journaled into the housing by a pin bearing and a bushing, the latter preferably cast into the housing and fastened therein by serrations. The turret head projects outwardly from the front surface of the tailstock housing, which thereby serves as an abutment. Since the turret head is adapted to rotate in contact with the housing of the tailstock, it is preferred to apply a hard metal surface on the housing adjoining the turret to prevent rapid wear of the housing due to the frequent rotation of the turret. Further features and advantages of the invention will become more apparent by reference to the following detailed description and the appended drawings wherein:

Figure 1:
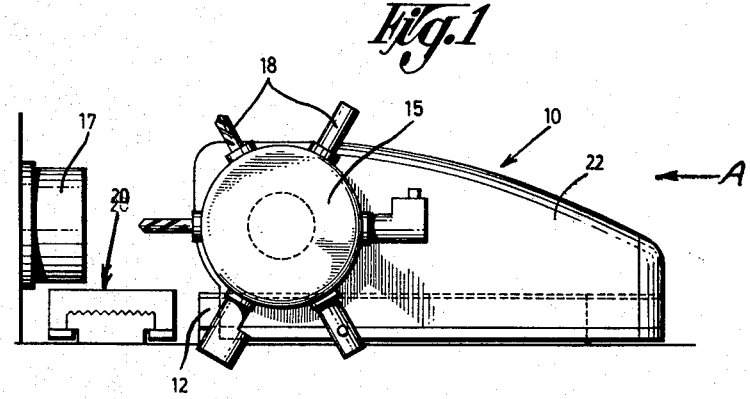
FIG. 1 is a front view of a tailstock according to the invention.

In the drawing a tailstock 10 is shown adapted to slide on a sliding base portion 12 of the lathe machine frame (not shown). A turret head 15 is rotatably mounted in the tailstock housing 22. Tools 18, such as drill-bits, reamers, center pins, countersinks etc., are mounted on the turret head 15. The tailstock 10 is arranged directly opposite and movable against the headstock of the lathe and a chuck 17 connected to the spindle (not shown). Thus work pieces held fast in the chuck can be machined. Optional transversely slidable tool holder means 20 can be provided to hold additional turning means for the workpiece or cutting means serving to sever the same after it has been shaped from the material (not shown) held in the chuck 7, means 20 includes a body 21 constructed with a light metal and including a sliding surface 23. A fixed base 25 includes longitudinal grooves complementarily mating with grooves in the sliding surface 23. The sliding surface is protected by a layer of metal harder than the metal of body 21. The arrangement of holder means 20 is similar to that of tailstock 10, described more fully hereinbelow.

The housing 22 of the tailstock 10 is made of a light metal such as aluminum or any other non-ferrous metals known to have relatively poor wearing qualities; the base portion 12 of the lathe is generally made of cast iron or steel.

Figure 2:
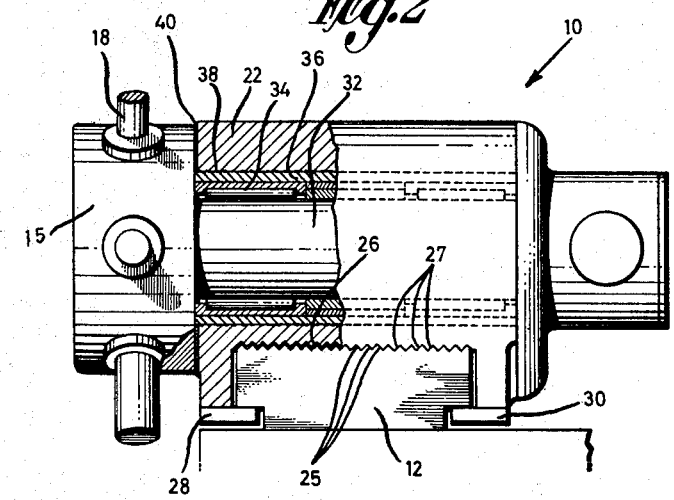
FIG. 2 is an elevational view partially broken away as seen in the direction of the arrow A in FIG. 1.

As shown in FIG. 2, the base portion 12 of the lathe is provided with longitudinal grooves complementarily mating with longitudinal grooves formed in sliding surface 27 of the housing 22 to facilitate the reciprocating motion of the tailstock 10. An unduly rapid wear of these surfaces, more particularly an unduly rapid wear of the light metal surface 27 of the housing 22 can be avoided by applying a thin, hard layer 26 thereonto consisting, for example, of molybdenum, which is sprayed on and subsequently ground smooth. Layer 26 may consist of other metals, the only requirement being that the layer is harder than the aluminum housing 22.

Fastening strips 28 and 30 are attached to the tailstock to secure and hold it captive relative to the base portion of the machine frame.

The turret head 15 is mounted for rotation with means for indexing the housing 22, by a shaft 32 integral with turret head 15, in pin bearings 34 and a bushing 36, the latter being firmly lodged within the housing 22. The bushing 36 is fastened to the housing 22, by means of a knurled surface as shown at 38.

In order to provide a firmly journaled turret head construction without backlash, even under extreme requirements, in the preferred embodiment the bushing 36 is cast into the housing 22. The turret head 15 is in abutment with the front surface of the housing 22, and in order to prevent a rapid wear due to the rotational friction between these two abutting surfaces, another thin, hard metal layer 40 is provided in the preferred embodiment for the front side of the housing 22, more particularly at the portion where it is in contact with the turret head 15. As a further result, not only will a wear of the light metal of the housing be prevented, but also the firm journaling of the turret head 15 and its journal shaft 32 will be preserved so that the tools on the turret 15 will remain properly aligned with the workpieces in the chuck 17.

It is to be understood that the invention was described by means of a preferred embodiment thereof, and therefore the entire scope of the invention is to be interpreted from the appended claims.

What we claim is:

1. In a metal working machine, a stationary base portion having a guide surface and a movable lightweight metal tailstock having a sliding surface adapted to engage the guide surface of said base portion, the surface of said tailstock being harder than the metal of said lightweight metal tailstock.

2. A metal working machine as in claim 1 including a turret head rotatably mounted in said tailstock, said tailstock including a turret head mating surface, said turret head including a sliding surface positioned adjacent the mating surface of said tailstock, the mating surface being harder than the metal of said lightweight metal tailstock.

3. In a metal working machine, a movable lightweight metal tailstock having a sliding surface, a stationary base portion, said base portion including a plurality of longitudinal grooves on the upper surface thereof, said tailstock sliding surface having a plurality of longitudinal grooves thereon and adapted to mate with the grooves on the base portion, said plurality of sliding surface grooves extending substantially the width of said base portion, a turret head rotatably mounted in the tailstock, a surface of said turret head being in sliding engagement with a side surface of said tailstock, a layer of metal harder than the metal of said tailstock secured to each of said side and sliding surfaces, thereby obviating the rapid wearing of the softer metal of said tailstock.

4. A metal working machine as in claim 3, including a transversely movable lightweight metal toolholder having a sliding surface, a fixed base for engaging said toolholder, a plurality of longitudinal grooves in both said fixed base and said toolholder sliding surface, said grooves in said fixed base being adapted to complementarily mate with the grooves in said toolholder sliding surface, a layer of metal harder than the metal of said tool-holder secured to said toolholder sliding surface, and a pair of strips secured to said tailstock and said toolholder to hold the tailstock and toolholder captive, relative to said tailstock base and fixed base, respectively.

References Cited by the Examiner

UNITED STATES PATENTS

| 1,026,389 | 5/12 | McClellan | 90—15 |
| 1,926,997 | 9/33 | Hoelscher | 82—32 |
| 2,291,803 | 8/42 | Grotnes | 78—15 |

FOREIGN PATENTS

| 602,285 | 3/26 | France. |

RICHARD H. EANES, JR., *Primary Examiner.*